United States Patent [19]

Laing

[11] 4,143,118

[45] Mar. 6, 1979

[54] APPARATUS AND METHOD FOR OZONE REDUCTION IN ELECTROSTATOGRAPHIC REPRODUCTION EQUIPMENT

[75] Inventor: Jean W. Laing, Rochester, N.Y.

[73] Assignee: Xerox Corporation, Stamford, Conn.

[21] Appl. No.: 822,494

[22] Filed: Aug. 8, 1977

[51] Int. Cl.$^2$ .................... B01D 53/34; G03B 27/16; B01J 8/24

[52] U.S. Cl. .......................... 423/210; 423/DIG. 16; 422/143; 422/144; 422/178; 55/68; 55/74; 55/302; 55/390; 250/324; 250/325; 355/18

[58] Field of Search ....... 423/210, 219, 581, DIG. 16; 250/326, 325, 324; 355/8, 18; 55/74, 181, 68, 390, 302; 23/288 E, 288 F, 288 S, 288 FB

[56] References Cited

U.S. PATENT DOCUMENTS

| | | | |
|---|---|---|---|
| 1,422,211 | 7/1922 | Lamb | 423/210 |
| 2,203,188 | 6/1940 | Beer | 423/210 X |
| 2,298,607 | 10/1942 | Anderson | 423/210 |
| 3,151,943 | 10/1964 | Fujimoto et al. | 423/210 X |
| 3,675,096 | 7/1972 | Keiss | 250/325 X |
| 3,775,008 | 11/1973 | Schaeffer | 355/18 |
| 3,862,420 | 1/1975 | Banks et al. | 250/324 |

FOREIGN PATENT DOCUMENTS

308766  1/1971  U.S.S.R. .................... 55/302

Primary Examiner—Earl C. Thomas
Attorney, Agent, or Firm—James J. Ralabate; Ernest F. Chapman

[57] ABSTRACT

Disclosed is an apparatus and method for controlling corona generated ozone emissions in electrostatographic copying equipment. This is achieved by directing ozone rich gases through a novel fluidized bed reactor located in an exhaust channel of an electrostatographic copier. The novel reactor is provided with means for continuously or periodically purging fine particles from the perforated wall of the catalyst containing chamber proximate to the exhaust end of the reactor; thereby, preventing such fine particles from becoming permanently entrained within such perforation and creating a substantial pressure drop between the interior of the catalyst containing chamber and the exterior of said chamber proximate to exhaust end of the reactor. The preferred ozone neutralization system contemplated for use in this invention is a multiple stage device wherein a number of reactors are connected to one another in series. Each reactor in series contains catalytically active granules capable of neutralization of noxious ingredients which may be present in the gases collected from the vicinity of the corona discharge electrode.

9 Claims, 5 Drawing Figures

APPARATUS AND METHOD FOR OZONE REDUCTION IN ELECTROSTATOGRAPHIC REPRODUCTION EQUIPMENT

BACKGROUND OF THE INVENTION

1. Field of the Invention

This invention relates to an apparatus and a method. More specifically, this invention is directed to an electrostatographic apparatus equipped with an improved fluidized bed reactor for reduction of ozone emissions into the ambient environment.

2. Description of the Prior Art

The adverse effects of ozone on equipment and human beings is well-known. With the enactment of OSHA and the subsequent setting of tolerance levels pursuant to this legislation, the industrial community has intensified its efforts to minimize generation of ozone in its processes and equipment. The need for control of ozone emissions from equipment is especially critical in the area of consumer products since the user of such devices is ordinarily unaware of the hazard and unlikely to take precautions to protect himself.

As is well known, ozone is generated in electrostatographic copying equipment as a result of corona discharge during sensitization of the recording surface of the photosensitive member. This is also true of other stations within the copier which employ corona discharge devices. At present, ozone emissions into the surrounding machine environment are controlled by "filtering" devices which are impregnated with catalysts capable of conversion of the ozone to relatively harmless substances. Of course, the efficiency of catalytic neutralization of ozone is dependent upon a number of factors. At present, the ozone "filtering" devices employed in electrostatographic copiers are located in the copier exhaust stream. These filters are generally characterized as "fixed" bed devices; that is, the catalyst is impregnated into a porous support which is integrated within the copier exhaust housing (IBM Technical Disclosure Bulletin, Vol. 11:8, January 1969); or is incorporated into the corona discharge electrode structure itself (U.S. Pat. No. 3,675,096). Each type of ozone control system described hereinabove is limited in its ability to neutralize the ozone due to the physical constraints placed upon the catalysts containing element.

As will be appreciated, the amount of exposure of the ozone laden vapors to catalyst determines the capacity and efficiency of ozone neutralization by the catalyst containing element. Where the catalyst is entrained within or coated upon a porous or fibrous support, ozone laden vapors must be capable of penetration of this structure for contact with the catalyst. At first, it would appear that this would not present any problems. However, it must be remembered that ozone laden exhaust produced by electrostatic copiers also contains numerous particulates (e.g. toner, paper fragments, etc.). These particulates can pass with the ozone laden exhaust to the catalyst support and, after a relatively brief period, impregnate the support material thereby diminishing the porosity of the catalyst containing element. As the porosity of the support decreases, so to does the amount of catalyst accessible to the ozone laden vapors. The above situation can require frequent replacement of the catalyst containing element or some sacrifice in the completeness of exhaust treatment in order to extend catalytic activity of the "filtering" device.

In order to eliminate many of the deficiencies in the prior art devices, a co-worker of mine has proposed replacement of the traditional type of fixed bed ozone neutralization filters with a fluidized bed reactor system (copending patent application filed by William K. Murphy on or about June 29, 1977 — U.S. Ser. No. 812,195 — Xerox docket file designation D/77221). As acknowledged by Murphy at page 8, line 19 to page 9, line 8 of his specification, fluidization of the catalytically active materials within his reactor results in the generation of very fine particles of catalyst and carrier. In order to prevent such particles from being expelled into the copier environment Murphy suggests entrapping such materials within the perforated disc which is located proximate to the exhaust end of the reactor, or by providing for precipitation of such particles upon their escape from the reactor. With regard to his latter suggestion, such precipitation involves introduction of yet another station within the copier and disposal of the collected materials. In the event that fine particulates become entrapped within the perforated disc proximate to the exhaust port, the pressure differential between the interior of catalyst containing chamber and the exterior of said chamber proximate to the exhaust end of the chamber will increase as restriction to flow through the perforated disc becomes more pronounced. As is well known, if this differential or pressure drop becomes too great, fluidization of the catalysts will become impaired. In order to avoid a reduction in the efficiency of Murphy's device, the perforated disc proximate to the exhaust end of the reactor must be periodically serviced (back flushed) or replaced. This would require additional hardware or increased servicing costs.

Accordingly, it is the object of this invention to remedy the above as well as related deficiencies in the prior art.

More specifically, it is the principal object of this invention to provide a catalyst containing element for neutralization of ozone laden vapor which is less subject to fouling by particulates than prior art devices and yet does not allow for substantial by-pass of the ozone laden vapors.

It is another object of this invention to provide a catalyst containing element for neutralization of ozone laden vapors which has extended catalytic activity.

It is yet another object of this invention to provide a catalyst containing element for neutralization of ozone laden vapors in an electrostatographic copying system.

Still yet additional objects of this invention include a method for control of ozone emission levels of electrostatographic copiers and electrostatographic copiers which include an improved ozone neutralization catalytic element.

SUMMARY OF THE INVENTION

The above and related objects are achieved by providing an electrostatographic copier with a granular bed-filter reactor which includes a chamber having an inlet and exhaust orifice, a perforated gas permeable member extending across the entire area of each orifice, a bed of catalytically active granular material covering the gas permeable member of the inlet orifice, and means for impelling ozone laden vapors into said chamber through the gas permeable plate of the inlet orifice thereby causing fluidization of the catalytically active granular material. The perforations of the gas permeable members are preferably sufficient in size to prevent passage of airborne particulates and retain the catalytically active granular material within the reactor chamber.

In order to prevent particulates from clogging the perforated gas permeable members of the reactor, means are provided for reorientation of the gas permeable members relative to the inlet and exhaust orifice so as to back flush said perforated member and thereby dislodge particles entrained therein.

DESCRIPTION OF THE INVENTION INCLUDING PREFERRED EMBODIMENTS

Figure 1:
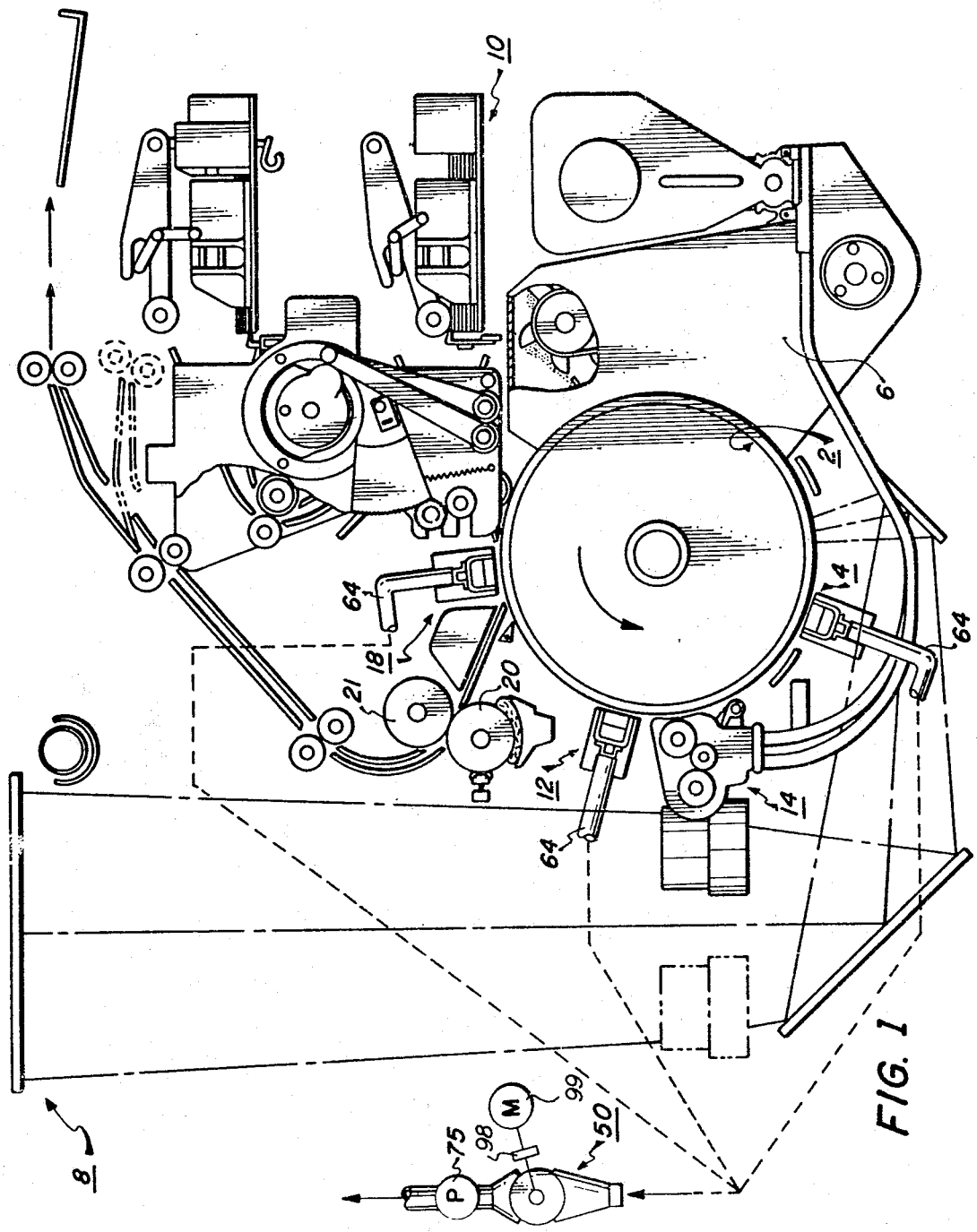
FIG. 1 is an elevational view in cross-section of an electrostatographic copier suitable for use in combination with a fluidized bed reactor designed for ozone neutralization.

In FIG. 1 is shown an electrostatographic copier of the type described in U.S. Pat. No. 3,775,008. The detailed description of the copier illustrated in that patent is hereby incorporated by reference in its entirety.

In summary, the apparatus shown in FIG. 1 comprises many of the standard components currently in use in the Xerox 4000 copier. Xerox and 4000 are trademarks of Xerox Corporation. As is true of most electrostatographic copiers, a photosensitive element 2 is initially sensitized by charging with corona discharge electrode 4, followed thereafter by exposure to a light and shadow image at exposure station 8. This results in the selective discharge of the charge on the photoreceptor thereby producing a latent electrostatic image which is rendered visible by development with charged electroscopic toner particles at developer station 6. Subsequent to development, the toner image is transferred to a sheet of plain paper supplied from paper tray 10. This is achieved by introducing a sheet of paper from supply tray 10 so as to be in synchronous movement with the rotation of the photosensitive element. In order to assist the transfer of the toner image to the paper, detack corotron 18 charges the backside of the sheet of paper so as to reduce the electrostatic attraction of the toner to the photoreceptor and thereby enhance its transfer to the paper supplied from tray 10. Subsequent to transfer of a substantial portion of the toner image from the photoreceptor to the paper, the paper is stripped from the photoreceptor and passed between a pair of rollers 20, 21 whereupon the combination of heat and pressure permanently affixes the toner image to the paper. Following such transfer, the photoreceptor continues to rotate in the direction indicated by the arrow and the residual toner image remaining thereon is subjected to charge neutralization by pre-clean corotron 12. Such charging further reduces the adherence of the residual image to the photoreceptor thereby facilitating its removal at cleaning station 14.

As will be apparent from the above description, at least three separate stations require some form of corona discharge in order to successfully complete the document reproduction cycle. Attempts at substitution of non-ozone generating charging means for the above corona discharge electrodes (4, 18 and 12) have not up to now proven technically feasible and/or commercially acceptable.

Figure 3:
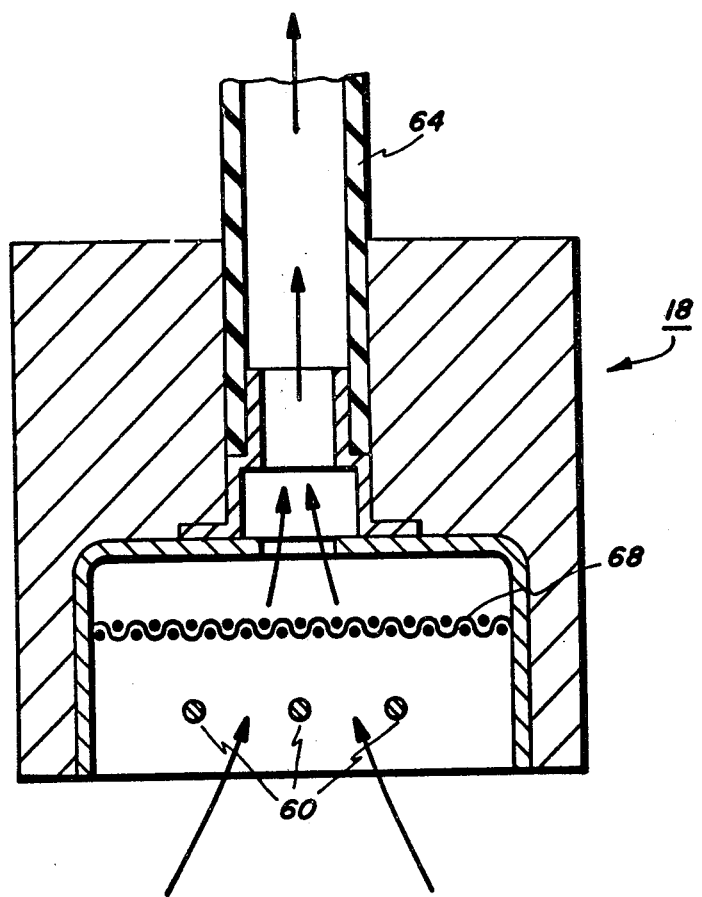
FIG. 3 is an enlarged elevational view in cross-section of a corona discharge device of the type used in FIG. 1.

As shown in FIG. 3, each of these corona discharge electrodes is provided with a conduit 64, and the conduit is connected through appropriate ducting (not shown) to a source of negative pressure 75 (of FIG. 1) thereby enabling the collection of ozone laden vapors and the channeling of such vapors to ozone filtering element 50.

Figure 2:
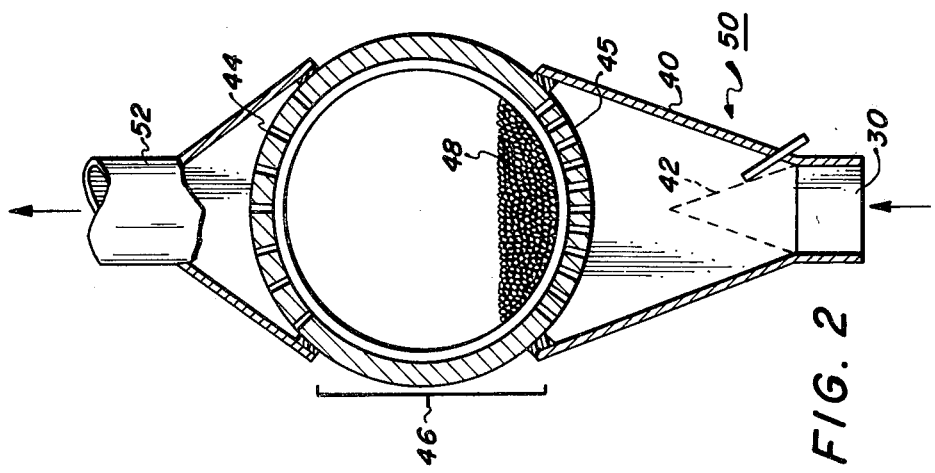
FIG. 2 is an enlarged elevational view in cross-section of a fluidized bed reactor designed for ozone neutralization.

FIG. 2 is illustrative of a typical ozone filtering element suitable for use in this invention. The device illustrated in FIG. 2 comprises a housing 40 which is divided into at least three separate chambers. As the exhaust gases are introduced into the housing in the direction indicated by the arrow, they are deflected by diffuser element 42 prior to coming into contact with the ozone neutralization catalyst 48 contained in the interior chamber 46 of this filtering device. The interior chamber of this device is defined laterally by the walls of the housing and horizontally by a pair of perforated gas permeable members 44 and 45. The lateral walls and perforated members which define the interior chamber of the illustrated device form a canister which is rotatably mounted within the reactor. As shown in FIGS. 1 and 2, activation of motor 99 causes the canister to rotate to a new position thereby exposing at least a portion of the perforated member proximate to the exhausted end of the reactor to exhaust gases from the inlet end of the reactor. In the device specifically illustrated in FIG. 1, the degree of rotation of the canister is controlled by the interposition of a 180° clutch 98 between the motor and the canister. Either preliminary to or subsequent to the completion of a copy cycle or at a prescribed period of usage, the motor is automatically energized and the canister rotated 180°. In an alternative embodiment of this invention, the entire canister wall is comprised of perforated material and the rotation thereof carried on continuously during operation of the reproduction system. Of course, the above operation, namely, the rotation of the canister, can also be performed manually.

Figure 4:
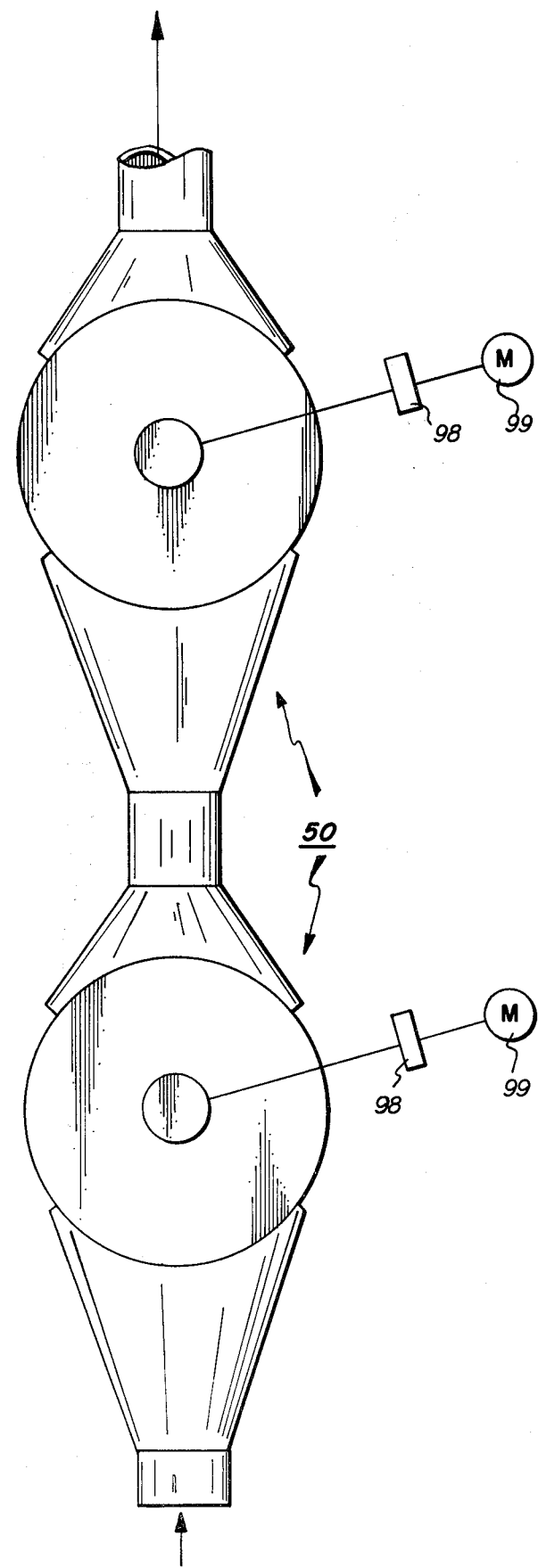
FIG. 4 is an enlarged elevational view of a pair of fluidized bed reactors connected to one another in series.

As ozone laden vapors are introduced into the filtering element, the pressure driving such gases causes the catalytically active granular material 48 to become fluidized. This feature exposes a larger amount of the catalytically active granules to the gases than could be achieved through the use of a fixed bed filtering element. Subsequent to contact of these ozone laden vapors with the catalyst, the gases are expelled from the filtering device through orifice 52. These gases may be further reacted with additional ozone reduction catalysts or additional catalytic materials for neutralization of other by-products of corona discharge (see FIG. 4 for a typical composite catalytic filtering element). The catalytic filtering device of FIG. 2 can be further modified, as in FIG. 5, by the simple addition of a heating element 60 at inlet 30 of the reactor. This pre-heating element will necessarily increase the temperature of these gases as they enter the reactor thereby enhancing the efficiency of ozone neutralization by the catalyst contained with the filtering device.

In order to prevent expulsion of particulates into the copier environment, the size of perforations of the gas permeable members are carefully controlled. After a moderate amount of use, the gas permeable members of this device can become increasingly more resistant to the flow of gases. As noted hereinabove, in the discussion involving the problems inherent in prior art devices, such impairment in gas flow can adversely effect fluidization of the catalytically active material. The pressure drop across the device can be monitored by appropriate instrumentation and appropriate measures taken to preclude this condition from having deleterious consequences with respect to the efficiency of the reactor.

Figure 5:
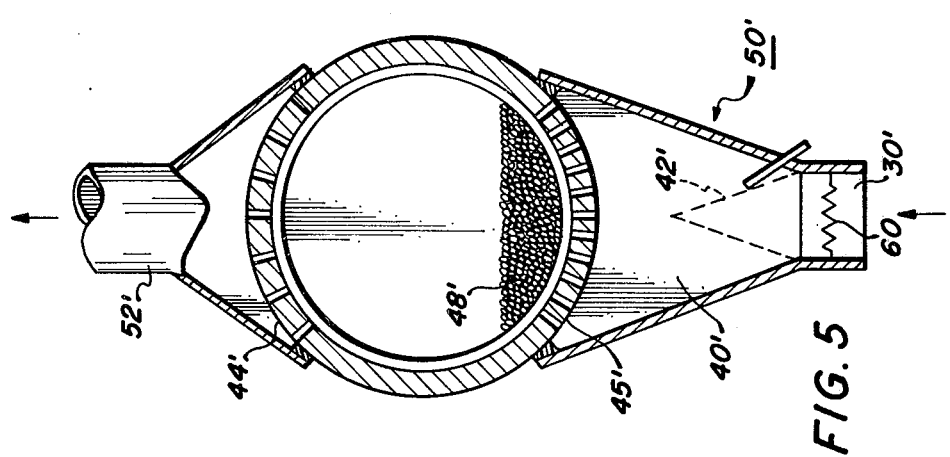
FIG. 5 is an enlarged elevational view in cross-section of a fluidized bed reactor, similar to FIG. 2, equipped with a preheater element.

It is also contemplated that the fluidized bed ozone reactor of the type described in FIGS. 2 and 5 be used in conjunction with other catalytically active ozone neutralization devices of the type described in the prior art. For example, in FIG. 3 is shown a simplified version of the type of ozone control device disclosed in U.S. Pat. No. 3,675,096 (FIG. 3 of patent). Upon activation of this device, a corona emission is created by wires 60. Concurrent with such activation, a negative pressure is placed upon the system thereby drawing an ozone laden airstream into duct 64. As indicated previously in the general description of FIG. 1, such negative pressure causes collection of the ozone laden vapors and the channeling of such vapors into an ozone filtering device of the type illustrated in FIGS. 2 and 5. In FIG. 3, screen 68 is impregnated with an ozone neutralization catalyst to achieve in situ neutralization of at least some of the ozone prior to its collection and transmission to filtering element 50 (FIG. 1).

The catalytically active granular material suitable for use in the apparatus and method of the instant invention can be virtually any material disclosed in the art which is capable of conversion of ozone to relatively innocuous products. Typical catalytically active materials which are suitable for this purpose include those substances which have been historically termed "hopcalites".

Briefly, these catalysts comprise metal oxides or basic sulfates, acetates or carbonates of the more common metals either alone or in admixture. These substances are prepared under conditions intended to produce a finely divided granular material. Among the metals whose oxides, basic carbonates, basic acetates and basic sulfates have been found to be catalytically active are: manganese, cobalt, copper, iron, nickel, bismuth, lead and silver. In practice, mixtures of two or more of the above materials are preferable to a single compound acting alone. Moreover, catalytic activity of these compounds or mixtures of these compounds can be further enhanced by the addition of very minor quantities of finely divided metals, particularly metals of the platinum group, (these metals being regarded as promoters). The above catalytic materials are typically prepared from colloidal dispersions by precipitation. Following recovery of the precipitate, moisture is removed by low temperature drying. Techniques and apparatus suitable for use in the preparation of the above materials are fully described in U.S. Pat. No. 1,345,323, which is hereby incorporated by reference in its entirety.

The catalytically active granular material of the type described hereinabove can be formed into granules or can be associated with any one of the common catalyst carriers available in the art. Hopcalite-type catalytic materials are commercially available from the Mine Safety Appliance Company. Materials marketed commercially by this vendor are believed to be co-precipitates or physical mixtures of manganese dioxide and cupric oxide. Certain modified hopcalite catalysts are also commercially available and these include, in addition to the ingredients prescribed hereinabove, minor amounts of cobalt oxide and/or silver oxide.

The fluidized bed reactors described herein can also be employed in a variety of other environments where human exposure to ozone is a problem. For example, these fluidized bed reactors are highly adaptable for use in high altitude military aircraft and in commercial aircraft where the life support systems contained therein require the utilization of air from the high altitude environment. The improved fluidized bed reactor described hereinabove can also be used in combination with other catalytic materials for control of gaseous emissions (other than ozone) of industrial processes.

What is claimed is:

1. In an electrostatographic reproduction system, which includes a plurality of corona discharge electrodes, means for circulation of an airstream into and through said electrodes so as to withdraw ozone laden vapors away from the surface subjected to corona discharge, means for ducting said airstream to an ozone neutralization chamber, an ozone neutralization chamber which includes a granular bed filter reactor having an inlet and an exhaust orifice, a perforated gas permeable member extending across the area of each such orifice, a bed of catalytically active granular material loosely covering the gas permeable member of the inlet orifice, and means for impelling ozone laden vapors into said chamber through the gas permeable member proximate to the inlet orifice, thereby causing (a) fluidization of the catalytically active granular material and (b) contact of said material with the ozone laden vapors resulting in substantial reduction of ozone content in said airstream, the improvement comprising means for purging particulates from perforations of the gas permeable member proximate to the exhaust end of the reactor by reorientation of the gas permeable member relative to inlet and exhaust orifices of the reactor whereby at least a portion of the gas permeable member proximate to the exhaust orifice is exposed to gases from the inlet orifice thereby back flushing entrapped particulates from perforations in said member and means for simultaneously filtering particulates by the gas permeable member proximate to the inlet orifice while contacting the bed of catalytically active granular material with the noxious vapors.

2. The improved electrostatographic copier of claim 1 wherein means are provided for pre-heating the ozone laden vapors prior to contact of such vapors with the catalytically active granular material.

3. The improved electrostatographic copier of claim 1 wherein the catalytically active granular material comprises a hopcalite type catalyst.

4. The improved electrostatographic copier of claim 1 wherein the ozone laden vapors are ducted through a plurality of granular bed filter reactors.

5. The improved electrostatographic copier of claim 1 wherein the catalytically active granular material comprises a co-precipitate of manganese oxide and cupric oxide.

6. The electrostatographic copier of claim 1, wherein the reorientation of the gas permeable member relative to the inlet and exhaust orifices of the reactor occurs periodically.

7. The electrostatographic copier of claim 1, wherein the reorientation of the gas permeable member relative to the inlet and exhaust orifices of the reactor occurs essentially continuously during operation of the reproduction system.

8. A method for neutralization of ozone laden vapors produced during corona discharge of an electrostatographic reproduction system comprising:
  (a) providing means for collection and transport of ozone laden vapors generated during operation of said system;
  (b) providing an ozone neutralization chamber which includes a granular bed filter reactor having an inlet and an exhaust orifice, a perforated gas permeable member extending across the area of each such orifice, a bed of catalytically active granular material loosely covering the gas permeable plate of the inlet orifice, means for impelling ozone laden vapors into said chamber through the gas permeable member proximate to the inlet orifice, and means for purging particulates from the gas permeable member proximate to the exhaust end of the reactor by reorientation of the gas permeable member relative to inlet and exhaust orifices of the reactor whereby at least a portion of the gas permeable member proximate to the exhaust orifice is exposed to gases from the inlet orifice thereby back flusing entrapped particulates from said member; and
  (c) impelling ozone laden vapors into said chamber through the gas permeable plate proximate to the inlet orifice, thereby causing (i) fluidization of the catalytically active granular material, (ii) contact of said material with the ozone laden vapors resulting in substantial reduction of ozone content generated during operation of said system and (iii) entrapment of particulates in the gas permeable plate proximate to the inlet orifice while flushing entrapped particulates from the gas permeable member proximate to the exhaust orifice.

9. In a granular bed filter reactor having an inlet and an exhaust orifice, a perforated gas permeable member extending across the area of each such orifice, a bed of catalytically active granular material loosely covering the gas permeable member of the inlet orifice, and means for impelling an airstream containing noxious vapors into said chamber through the gas permeable member proximate to the inlet orifice, thereby causing (a) fluidization of the catalytically active granular material and (b) contact of said material with the noxious vapors resulting in substantial reduction of the noxious vapor content in said airstream, the improvement comprising means for purging particulates from the gas permeable member proximate to the exhaust end of the reactor by reorientation of the gas permeable member relative to inlet and exhaust orifices of the reactor whereby at least a portion of the gas permeable member proximate to the exhaust orifice is exposed to gases from the inlet orifice thereby back flushing entrapped particulates from said member and means for simultaneously filtering particulates by the gas permeable member proximate the inlet orifice while contacting the bed of catalytically active granular material with the noxious vapors.

* * * * *